Aug. 4, 1931.  W. E. REED  1,817,099
FEEDING MECHANISM
Original Filed Aug. 13, 1924
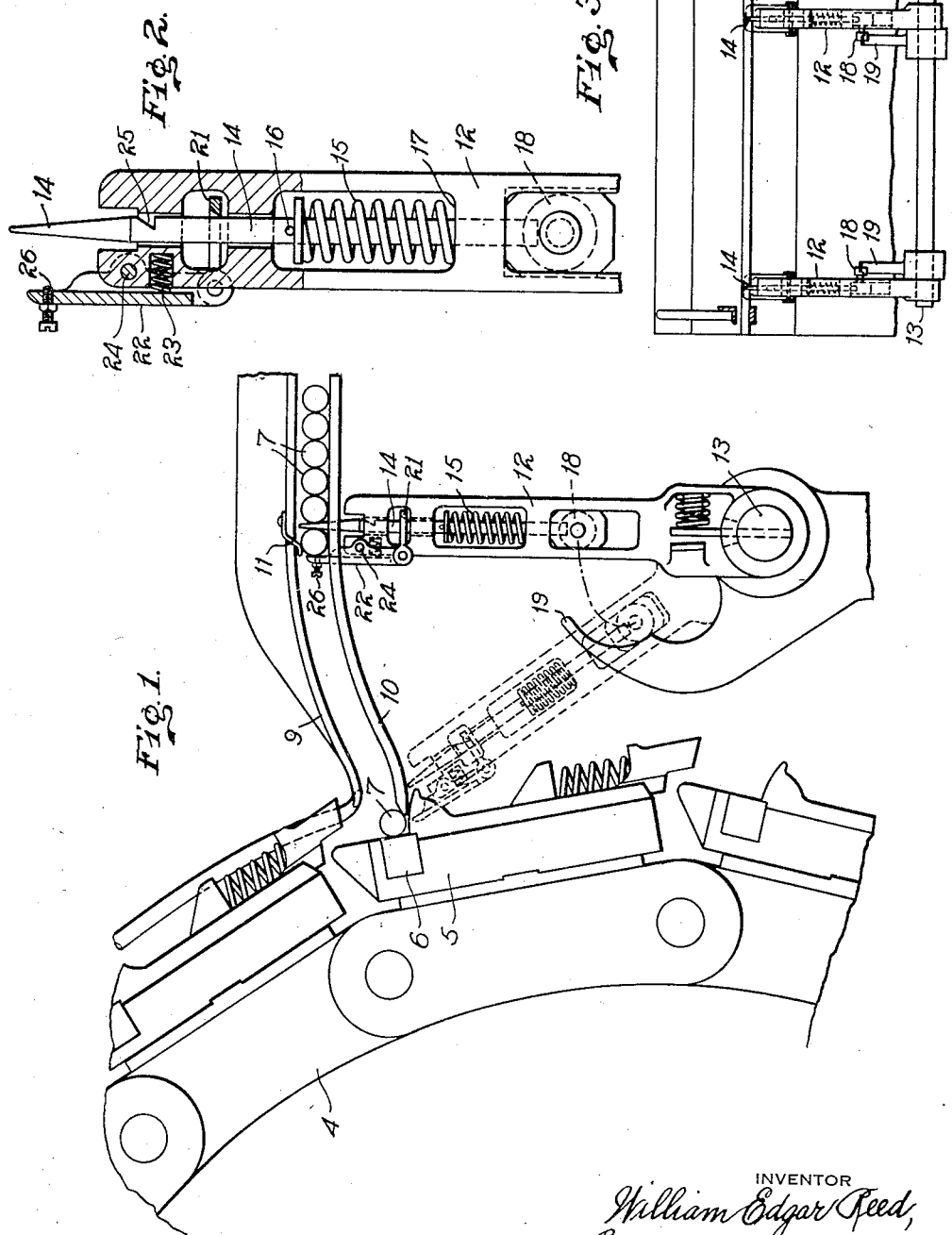
INVENTOR
William Edgar Reed,
By Archworth Martin,
Attorney.

Patented Aug. 4, 1931

1,817,099

UNITED STATES PATENT OFFICE

WILLIAM EDGAR REED, OF PITTSBURGH, PENNSYLVANIA

FEEDING MECHANISM

Original application filed August 13, 1924, Serial No. 731,831. Divided and this application filed December 3, 1928. Serial No. 323,539.

My invention relates to feeding mechanisms, and is hereinafter described as employed more particularly in the feeding of wires or rods to a carrier, but it is susceptible of use in the feeding or transferring of various other articles.

The invention constitutes a division of the disclosure contained in my application upon which Patent No. 1,694,081 of December 4, 1928, is based.

One object of my invention is to provide means for advancing said wires or rods, singly or in groups, in a desired alinement.

Another object of my invention is to provide a device which will transfer articles, one by one, in an improved manner.

Another object of my invention is to provide an improved form of mechanism for effecting engagement and disengagement of a transfer device with articles which are to be transferred.

Still another object of my invention is to provide a transfer device of generally improved and simplified form.

One form which the invention may take is shown in the accompanying drawings, wherein Figure 1 is a side elevational view of the feeding device, and also showing a fragmentary portion of a carrier for receiving the articles that are fed or transferred; Fig. 2 is an elevational sectional view, on an enlarged scale, of a portion of the apparatus of Fig. 1, and Fig. 3 is an end elevational view of the apparatus of Fig. 1, on a reduced scale.

Only so much of the mechanism of my said patent is herein shown as is necessary to an understanding of the present invention. The apparatus is shown as supplying stay wires to a conveyer composed of chains 4 which carry anvil bars 5 that in turn support electrode bars 6, in case the invention is to be employed in connection with a welding machine similar to that shown in my said patent.

The wires to be transferred to and carried by the conveyer are represented by the numeral 7. These wires or rods are supplied in any suitable manner to a stationary guideway composed of upper and lower rails 9 and 10 respectively, (in any suitable manner). Yieldable fingers 11 serve to limit the advancing movement of the wires 7 along the guideways, such fingers yielding to permit wires to be removed by the pick-up mechanism or carrier arms, as hereinafter described.

In feeding wires or rods, two or more carrier arms will usually be employed in order to insure that both ends of the wires are properly advanced, the two carrier arms being disposed as shown in Fig. 3. A description of one of the carrier arms will suffice for both.

The carrier arms 12 are rigidly mounted upon a rock shaft 13 which may be oscillated in any suitable manner, in timed relation to the movement of the conveyer 4, so that the wires 7 will be deposited at the proper points upon the moving conveyer.

Each carrier or rocker arm 12 supports a plunger 14 that is yieldably held in its uppermost position by means of a compression spring 15, whose upper end engages a pin 16 which extends through the plunger, and whose lower end seats upon the web 17 of the arm 12. A roller 18 is journalled in the lower end of the plunger 14, so as to draw the plunger downwardly when the arm 12 is swung forward to the position indicated by dotted lines in Fig. 1, the roller in such position engaging a cam member 19 to effect downward movement thereof.

Upon downward or retractive movement of the plunger 14, it is latched in said position by means of a latch member 21 that is biased toward latching position by means of a lever 22 and spring 23, the lever 22 being pivoted at 24 to the arm 12, and the spring 23 serving to bias it in a clockwise direction, to pull the latch 21 into a notch 25 in the plunger 14.

The cycle of operations, commencing with the parts in the positions shown in full line in Fig. 1, is as follows:—The shaft 13 is rocked to swing the upper end of the arm 12 in a counter-clockwise direction, thus carrying the foremost wire 7 into position against the carrier, the forward end of the guideway 10 exerting a camming action to withdraw the wire from between the plunger 14 and the lever 22. During this feeding movement, the cam roller 1 is drawn downwardly by the cam member 19 and the latch 21 permitted to engage the notch 25 and hold the plunger 14 in retracted position.

The shaft 13 will then be rocked in a clockwise direction until the upper end of the lever 22 engages the foremost stay wire, whereupon it will be rocked against the compression of the spring 23, thus releasing the plunger 14 and permitting it to spring up into the position shown in Figs. 1 and 2. The wire thereby engaged may then be advanced to the conveyer 4, as above explained.

In order to adjust the device for wires of various thickness, and to insure tripping and unlatching of the plunger at the proper instant, I provide an adjustable stop screw 26 in the upper end of the lever 22, this screw serving to engage the wires, instead of having the wires directly engaged by the lever. The spring 23 not only serves to effect automatic movement of the latch 21, but also serves as a yieldable means for permitting the lever 22 to adapt itself to wires of varying thickness.

It may be desirable to advance two or more wires at one time, and in order to accomplish this the stop screw 26 is suitably adjusted so that the plunger will not be released until it has been carried past the desired number of wires.

I claim as my invention:

1. A feeding device, comprising an oscillatory member, a movable stop carried thereby in position to engage an article to be fed, a plunger adjacent to but spaced from said stop, and means for releasably holding said plunger in retracted position, the said means being actuated by movement of said stop when brought into engagement with the article, to release said plunger and permit it to move into position adjacent to the opposite side of said article.

2. A device for feeding bars and the like, comprising a reciprocatory member, a pivoted stop carried thereby, a latch connected to said stop, a plunger mounted adjacent to said stop in position to be moved into engagement with the opposite side of a bar engaged by said stop, and means for yieldingly holding said plunger in one position, the said latch normally serving to hold said plunger against said yielding means, but disengageable therefrom upon movement of said stop in one direction.

3. A feeding device for bars and the like, comprising a reciprocal member, a movable stop carried thereby, a plunger carried thereby, and means effective upon engagement of the stop with one side of a bar for causing the plunger to be moved into engagement with the opposite side of said bar.

4. A feeding device comprising a carrier, a stop member, a finger for effecting a feeding operation, means placing the finger under spring tension upon movement of the carrier, and means operable upon engagement of the stop member with an article to be fed, for releasing the finger.

5. A feeding device comprising a carrier, a pair of gripping members on said carrier, one of said members being in the form of a pointed finger to permit movement thereof longitudinally into position between two articles to separate them, and means operated through movement of the carrier to move the last-named finger longitudinally of itself, the said finger member when projected between two articles being in cooperative gripping relation to the other gripping member.

6. A feeding device comprising a reciprocably-mounted member, means for supporting articles in proximity to said member in a position from which they are to be advanced, a device on said member positioned to engage the foremost article upon retractive movement of the member, and means controlled by said device and operable upon contact of the device with an article, to effect engagement with the article and advance the article during advance movement of the said member.

7. A feeding device comprising a reciprocably-mounted member, means on said member for engaging an article to advance the same, during advance movement of the said member, and a device on said member positioned to engage an article upon retractive movement of the member, and thereby control movement of the said means into article-engaging position.

In testimony whereof I, the said WILLIAM EDGAR REED, have hereunto set my hand.

WILLIAM EDGAR REED.